United States Patent Office 3,387,077
Patented June 4, 1968

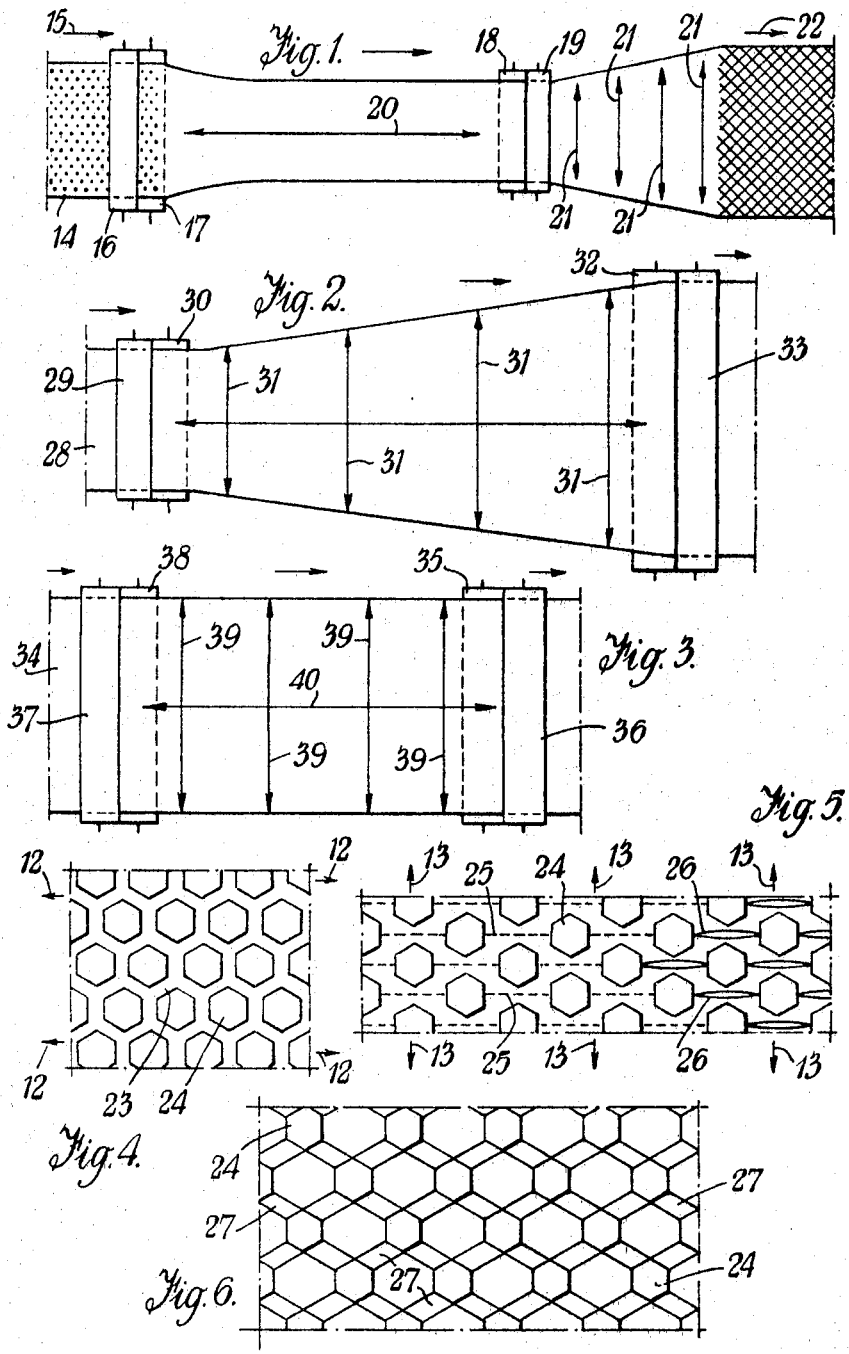

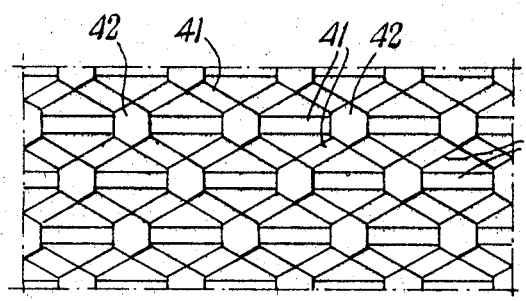
Fig. 7.
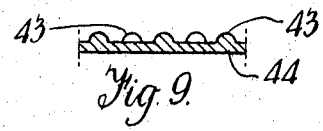
Fig. 9.
Fig. 8.
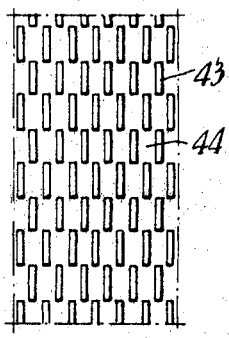
Fig. 10.
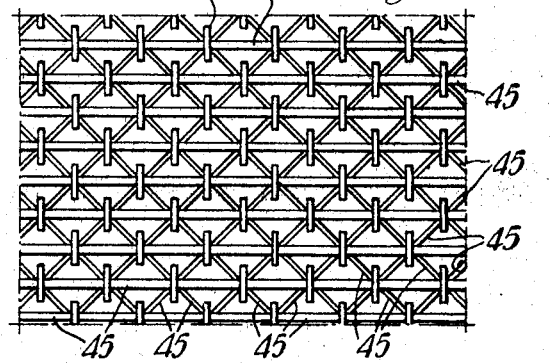
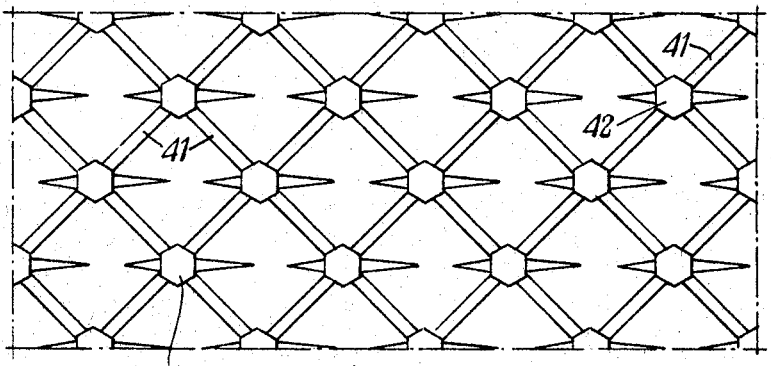
Fig. 11.

3,387,077
METHOD FOR THE PRODUCTION OF OPEN-WORK STRUCTURES
William Albert Sammons, Sawbridgeworth, and Albert Neville May, Hunsdon, England, assignors to T. J. Smith & Nephew Limited, Hull, England, a British company
Filed Aug. 21, 1964, Ser. No. 391,215
Claims priority, application Great Britain, Aug. 27, 1963, 33,949/63
4 Claims. (Cl. 264—289)

ABSTRACT OF THE DISCLOSURE

A method of producing open-work structures by stressing an embossed sheet of thermoplastic polymer in two distinct directions simultaneously until the material is permanently stretched and splits in regular positions between the bosses.

---

This invention relates to material in sheet form, which may have a thickness within the range of a fraction of a thousandth of an inch up to, say, half an inch or even more, and particularly, although not exclusively, to such sheet material formed from suitable thermoplastic materials such for example as polymers of the olefine group including ethylene and propylene, and copolymers thereof in any suitable blend as, for example, high-density or medium-density linear polyethylene and ethylene-propylene copolymer and some of the polyester group; and has for its object to provide such sheets as an openwork structure of desired configuration, in a simple and efficient manner.

It has previously been proposed in the specification of United States Patent No. 3,137,746, to produce open net fabrics from films of certain thermoplastic materials with one surface at least formed as an embossed surface of small solid bosses or raised figures arranged with spaces between adjacent bosses in longitudinal and transverse rows, by first stretching the embossed film at a desired rate in one direction, termed the longitudinal direction, and then subjecting the stretched film to a stretching which is transverse to the first stretching, which splits the film with a multiplicity of short splits through the material thereof, to leave a net-like structure in which each boss has four thinned narrow bands extending therefrom to the adjacent bosses of the two adjacent longitudinal rows when the material is expanded. From this it will be appreciated that the longitudinal stretching and the transverse stretching take place in succession.

According to the present invention—with material in sheet form as set forth in the first paragraph hereof (and which may include ductile metals) and which has one surface at least formed as an embossed surface of small solid bosses or raised figures arranged with spaces between adjacent bosses in longitudinal and transverse rows—a method for the production of an openwork sheet structure comprises subjecting such a sheet of material to stretching or stressing in two distinct directions *simultaneously* until the material takes a degree of permanent set and splits in various positions or zones of the thinned material located between the raised figures, to leave, upon the cessation of the stressing, bands integral with and interconnecting the various adjacent raised figures, to give a certain configuration depending to a large extent on (a) the mechanical properties of the material, (b) the arrangement of the raised figures, and (c) the shape of the raised figures.

In order that the invention may be better understood, it will now be described with reference to the accompanying diagrammatic drawings, which are given by way of example only and in which:

FIG. 1 is a diagrammatic plan view, to illustrate sheet material continuously travelling in a machine and subjected first to longitudinal stretch and then to transverse stretch.

FIG. 2 is a similar view to FIG. 1 but showing one method of subjecting the sheet material to simultaneous longitudinal and transverse stretch.

FIG. 3 is a similar view to FIG. 2, but showing another method for subjecting the material to simultaneous stretch in two directions, i.e., longitudinal and transverse.

FIG. 4 is a greatly enlarged plan view of a portion of a sheet of thermoplastic material having the upper surface with parallel rows of similar projections of regular hexagonal form in staggered relation, the lower surface of which material (not shown) is flat.

FIG. 5 is a similar view to FIG. 4, but showing the material after it has passed through a first stretching process, that is, by pulling in the direction of the arrows 12 (FIG. 4).

FIG. 6 is a similar view to FIGS. 4 and 5, but showing the material, from the condition of FIG. 4, after it has been subjected to transverse stretching, that is, after it has been pulled in the direction of the arrows 13 (FIG. 5) to form a net-like structure.

FIG. 7 is a greatly enlarged plan view of a portion of a sheet of thermoplastic material having the upper surface with parallel rows of similar projections of regular hexagonal form in staggered relation and with the lower surface flat, such as shown in FIG. 4, but after it has been simultaneously stretched in the longitudinal and transverse directions, in accordance with the method of the present invention.

FIG. 8 is a greatly enlarged plan view of a portion of a sheet of thermoplastic material having parallel rows of elongated rectangular projections on one surface, in staggered relation.

FIG. 9 is an enlarged end view of a portion of the sheet shown in FIG. 8.

FIG. 10 is a plan view of the material shown in FIGS. 8 and 9, after it has been subjected to simultaneous longitudinal and transverse stretching, in accordance with the present invention, and FIG. 11 shows a plan view of the material shown in FIG. 7 (which material is the result of simultaneous stretching in two directions according to the invention) after it has been further simultaneously stretched in two directions, according to the invention.

FIG. 1 illustrates a known method for subjecting sheet material, which is travelling through the machine, first to a longitudinal stretching and then to transverse stretching. In this figure, 14 is the material which is proceeding from a let-off roller (not shown) in the direction of the arrow 15. It passes through gripping and driving rollers 16 and 17 and then to other gripping and driving rollers 18 and 19 a desired distance from the first pair, and which have a greater linear surface speed than the rollers 16 and 17. As a result, the material is stretched in the longitudinal direction, that is, the direction indicated by the arrow 20; the width of the material is also lessened, as shown.

After the longitudinal stretching and beyond the rollers 18 and 19, the material is expanded (by any usual stentering means—not shown) in the direction of and as indicated by the arrows 21, and then passes in the direction of the arrow 22 to a suitable take-up roller (not shown).

FIGS. 4, 5 and 6 show sheet material in the three stages of the known old method of FIG. 1, and the material as shown in FIG. 4 passes between the rollers 16 and 17 to the first stretching.

(The "dots" on the material 14 at the left-hand side of the figure represent the hexagonal bosses of the material of FIG. 4, and the crossing lines to the right of the figure represent the net-like formation shown in FIG. 6.)

Briefly described, it should be remembered that the first stretching is in the direction of the arrows 12 (FIG. 4) and is continued until the thinned material 23, between the raised figures or bosses 24, is sufficiently stretched to take a degree of permanent set and is brought to the condition shown in FIG. 5.

Upon subjecting the thus-elongated material to the second stretching operation in the direction of the arrows 13 (FIG. 5), attention is directed to the fact that in positions indicated by the dotted lines 25 (shown to the left of FIG. 5) a multiplicity of splits 26 (indicated at the right of FIG. 5) are initiated. When the material has been expanded to the state shown in FIG. 6, a net structure has been formed and this comprises the hexagonal raised figures 24 each having four bands 27 integral therewith and extending to four adjacent raised figures. From FIG. 6 it will be seen that the width of the material as shown in FIG. 5 has been increased.

FIGS. 1, 4, 5 and 6, and the method of manufacture to which these figures relate, are as set forth in the before-mentioned U.S. Patent No. 3,137,746.

FIGS. 2 and 3 show two methods for the simultaneous longitudinal and transverse stretching of sheet material travelling through the machine.

In FIG. 2, the material 28 from a let-off roller (not shown) passes between gripping and driving rollers 29, 30 to any suitable known stentering device (not shown), to stretch it transversely as represented by the arrows 31, and until it passes between other gripping and driving rollers 32, 33.

As the transverse stretching (arrows 31) would normally longitudinally shorten the material in the stentering zone, a degree of simultaneous longitudinal stretching would be given to the material if the gripping and driving rollers 32 and 33 had the same linear surface speed as the gripping and driving rollers 29 and 30. However, to increase the amount of the longitudinal stretch, the rollers 32 and 33 can have a greater linear surface speed than the rollers 29 and 30.

The simultaneous stretching by the method indicated in FIG. 3 is as follows: This case is very similar to that described with reference to FIG. 2, but in place of expanding the width of the material 34 for the transverse stretching, it is kept to its own original width and the final gripping and driving rollers 35 and 36 have a greater linear surface speed than the first gripping and driving rollers 37 and 38.

From this it will be appreciated that normally the material 34, after it has been through the rollers 37 and 38, would become narrower unless restrained from so doing. Accordingly, by providing means to prevent the narrowing, the material is automatically transversely stressed, as represented by the arrows 39, whilst it is being longitudinally stretched (by the greater linear surface speed of the rollers 35 and 36 over the rollers 37 and 38) as indicated by the arrow 40.

Either of the means indicated in FIG. 2 or 3, or other suitable means, can be used for the simultaneous stretching in two directions, of the material having projections on at least one surface, to carry out the method of the present invention.

In one example of carrying the invention into effect, the material as indicated by FIG. 4 is subjected to simultaneous stretching in two directions by the method indicated in FIG. 3.

This causes the material to be given a net-like formation as indicated in FIG. 7, with six thinned bands 41 proceeding from each hexagonal raised figure 42 to the six adjacent hexagonal raised figures.

In another example according to the present invention, the sheet has the formation as shown in FIGS. 8 and 9 where 43 are elongated rectangular shaped projections on one surface of a suitable plastic film 44. Although the invention is not limited to the dimensions given, according to one experiment which was tried each projection was 1 mm. long and 0.25 mm. wide. There was 1 mm. spacing from rectangle to rectangle in the same row, and 0.5 mm. spacing between parallel rectangles.

The sheet material was subjected to simultaneous stretching according to the method of FIG. 3 and, whilst kept at the same width, it was longitudinally stretched to nearly three times its original length, with the result that the very openwork structure shown in FIG. 10 was formed, having six arms 45 from and integral with each of the rectangles 43, the arms also extending to and being integral with the six adjacent rectangles 43.

For carrying the present invention into effect, the stretching force in one direction may be equal to, or more than, or less than, that of the other simultaneously applied force in the orthogonal direction. Again, each simultaneously applied stretching force may be limited in its action and only remain effective to produce a certain percentage or actual elongation in the particular direction, whatever the percentage or actual elongation to be effected in the other direction. Still, again, the applied force of one of the two simultaneously applied forces, may be uniform or regularly or otherwise varied during its calculated continuance.

Although the simultaneous forces are in action simultaneously, in some cases one may be started more or less a short time before the other; or one may be calculated to end more or less a short time before the other.

The shape in plan of the raised figures on one or both surfaces of the sheet of material is preferably polygonal, irregular or regular—preferably the latter. For instance, they may be triangular, square, pentagonal, hexagonal, heptagonal, octagonal, or otherwise.

This preference is due to the fact that the more or less sharp angular edges of the raised figures cause substantial differentiation in the stresses of the thinned material of the sheet in the neighbourhood of said edges, which has been found to increase the potential splitting of the material from these positions when the simultaneous stretching is effected.

As will be appreciated, within the very wide limits of the present invention a very great variety of openwork sheet structures can be produced, extending from thin films, foils or the like to relatively thick plates, according to the dimensions of the starting material.

The raised figures can, as already set forth, be small hexagons with adequate spaces between. For example, in a specific instance the film material was 0.005″ thick, and the spaced raised figures in rows 60 to the inch in two directions mutually at right angles, to give some 3600 raised figures to the square inch. However, there may be rows say of 100 up to 300 or even more to an inch in two directions, as it is possible in commerce at present to procure embossing rollers having such a pitch spacing for the projections.

In other cases, the spacing of the raised figures or embossments could be relatively large, for example a quarter of an inch, and the thickness of the film could be as desired and, for example, one-sixteenth of an inch or more.

The thermoplastic material when employed can, if desired, include a suitable proportion of fillers and/or colouring matter, as well as stabilisers and otherwise, to produce the openwork sheet structure, it, however, being understood that only such additions and quantities thereof can be employed which will be compatible with the carrying of the process of the invention into effect.

In some cases the sheet material when made into a net-like structure by the simultaneous stretching methods according to the invention, may, and preferably whilst subjected to a heat treatment, be again submitted to a second simultaneous stretching method according to the invention.

An example of the result of this is shown in FIG. 11. This has been formed experimentally by taking the material shown in FIG. 7, subjecting it to a suitable softening heat and simultaneously stretching it both longitudinally and transversely. It will be seen that the arms 41 which connected the hexagons in the horizontal rows, have been broken, and the remaining arms 41 elongated and thinned. However, as will be appreciated, a more openwork structure has been formed, which is desirable for some uses of the material.

It should be understood that the present invention includes not only the main method and subordinate methods as herein described, but also the finished products themselves whenever formed by the said method or methods.

The invention is not limited to the precise forms or details herein set forth as these may be varied to suit particular requirements.

What we claim is:

1. A method for the production of openwork structures which comprises stressing a sheet of thermoplastic polymer, which sheet being previously unstressed and having at least one surface which is embossed with a plurality of bosses uniformly arranged in rows, in two distinct directions simultaneously until the sheet is permanently stretched and splits in regular positions between the bosses to leave, upon removal of stress, separate individual bands extending radially from and interconnecting each of said bosses to different bosses, thereby forming an openwork structure.

2. A method as defined in claim 1, in which the sheet is permanently stretched in both directions.

3. A method as defined in claim 1, in which the sheet is permanently stretched in one direction while at least the original dimension is maintained in the other direction.

4. A method as defined in claim 1, in which the polymer is high density polyethylene.

References Cited

UNITED STATES PATENTS

| | | | |
|---|---|---|---|
| 2,923,966 | 2/1960 | Tooke et al. | 264 |
| 2,958,148 | 11/1960 | Sylvester et al. | 264—293 X |
| 3,055,048 | 9/1962 | Koppehele | 264 |
| 3,137,746 | 6/1964 | Seymour et al. | 264—289 X |

FOREIGN PATENTS 672,757 10/1963 Canada.

JAMES A. SEIDLECK, *Primary Examiner.*

J. H. WOO, *Assistant Examiner.*